United States Patent
Han et al.

[11] Patent Number: 6,023,300
[45] Date of Patent: Feb. 8, 2000

[54] METHOD AND APPARATUS FOR ENCODING A CONTOUR OF AN OBJECT BASED ON A CONTOUR MOTION ESTIMATION TECHNIQUE

[75] Inventors: Seok-Won Han; Jin-Hun Kim, both of Seoul, Rep. of Korea

[73] Assignee: Daewoo Electronics Co., Ltd., Seoul, Rep. of Korea

[21] Appl. No.: 08/922,634

[22] Filed: Sep. 3, 1997

[30] Foreign Application Priority Data

Jul. 5, 1997 [KR] Rep. of Korea ............... 97-31211

[51] Int. Cl.[7] ............................................. H04N 7/32
[52] U.S. Cl. ........................................ 348/416; 348/699
[58] Field of Search ................................ 348/390, 402, 348/407, 409–413, 415, 416, 420, 699; 382/232, 236, 238, 241–244; H04N 7/32

[56] References Cited

U.S. PATENT DOCUMENTS

| | | | |
|---|---|---|---|
| 5,592,228 | 1/1997 | Dachiku et al. | 348/416 |
| 5,635,986 | 6/1997 | Kim | 348/420 |
| 5,691,769 | 11/1997 | Kim | 382/242 |
| 5,774,596 | 6/1998 | Kim | 382/242 |
| 5,805,736 | 9/1998 | Kim | 382/242 |
| 5,896,467 | 4/1999 | Kim | 382/242 |
| 5,912,991 | 6/1999 | Jeon et al. | 382/242 |
| 5,929,917 | 7/1999 | Kim | 348/699 |

*Primary Examiner*—Richard Lee
*Attorney, Agent, or Firm*—Pennie & Edmonds LLP

[57] ABSTRACT

A contour encoding apparatus encoding a contour of an object in a current frame based on a previous frame first generates a global motion vector between the current and the previous frames and calculates the number of contours in the previous frame. Then, the apparatus determines, for each of current contours, an optimum contour among the previous contours and detects a local motion vector between the optimum and the current contours. Once the global and the local motion vectors are determined, a predicted contour corresponding to each of the current contours is generated by shifting the optimum contour by the global and the local motion vectors. By using the predicted and the current contours, an error representing a difference therebetween is extracted. Subsequently, flag signals describing how close each of the previous contours is to a corresponding current contour are produced based on the number of the previous contours and contour encoding information corresponding to each of the current contours and sequences of the errors and the local motion vectors for the current frame are outputted based on the contour encoding information corresponding to each of the current contours. Finally, the flag signals and the sequences of the errors and the local motion vectors are multiplexed and then the multiplexed data is transmitted as an encoded contour data.

22 Claims, 7 Drawing Sheets

METHOD AND APPARATUS FOR ENCODING A CONTOUR OF AN OBJECT BASED ON A CONTOUR MOTION ESTIMATION TECHNIQUE

FIELD OF THE INVENTION

The present invention relates to a method and apparatus for encoding a contour of an object expressed in a video signal; and, more particularly, to a method and apparatus capable of generating control signals for systematically managing matching degrees between contours in a current frame and corresponding contours in a previous frame.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of the digital data therethrough, it is inevitable to compress or reduce the volume of data through the use of various data compression techniques, especially, in the case of such low bit-rate video signal encoders as video-telephone and teleconference systems.

One of such techniques for encoding video signals for a low bit-rate encoding system is the so-called object-oriented analysis-synthesis coding technique (see Michael Hötter, "Object-Oriented Analysis-Synthesis Coding Based on Moving Two-Dimensional Objects", *Signal Processing: Image Communication* 2, 409–428 (December, 1990)).

According to the object-oriented analysis-synthesis coding technique, an input video image is divided into objects; and three sets of parameters for defining the motion, contour and pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although there is no loss in the contour information.

To overcome the drawback, therefore, there have been proposed several methods to encode the contour information such as a polygonal approximation and a B-spline approximation. One of the disadvantages in the polygonal approximation is the roughness of the representation of the contour. The B-spline approximation is, on the other hand, capable of representing the contour more precisely; however, it requires a high-order polynomial to reduce the approximation error. The B-spline approximation technique, therefore, may result in an increased overall computational complexity of the video encoder.

One of the techniques introduced to ameliorate such problems associated with the rough representation of the contour and the increased computational complexity in the above approximation approaches is a contour approximation technique employing a discrete sine transform(DST).

However, although it is possible to remedy the rough representation and computational complexity, and somewhat reduce the volume of transmission data through the use of the DST based contour approximation, it still remains desirable to further reduce the volume of transmission data.

Therefore, there has been provided a contour encoding method employing a contour motion estimation technique based on a difference between a current and a previous contours. This method is described in a commonly owned copending application, U.S. Ser. No. 08/867,879, filed on Jun. 3, 1997, now U.S. Pat. No. 5,929,917 and entitled "METHOD AND APPARATUS FOR ADAPTIVELY CODING A CONTOUR OF AN OBJECT". In this method, each of current contours in a current frame is matched with one of previous contours in a previous frame which is most similar to the current contour. A shape difference between the current contour and its matched previous contour, index data assigned to the matched previous contour, and a spatial displacement, i.e., a motion vector, between the current contour and the matched previous contour are multiplexed and then the multiplexed data is transmitted as encoded contour data.

Since, however, the above method sporadically provides contour encoding information including the shape difference, the index data, and the motion vector, which corresponds to each of the current contours in the current frame, there still is generated a substantial amount of data to be transmitted and it may be difficult to exactly estimate the amount of the data. Consequently, it is preferable to provide control signals for systematically managing the matching degrees between the current contours and their matched previous contours to thereby effectively incorporate the contour encoding information and further reduce the volume of transmission data in order to successfully implement a low-bit rate codec system having, e.g., a 64 kb/s transmission channel bandwidth.

SUMMARY OF THE INVENTION

It is, therefore, a primary object of the invention to provide an improved contour encoding method and apparatus capable of generating control signals for managing matching degrees between current contours and their matched previous contours to thereby effectively transmit contour encoding information produced based on a contour motion estimation technique.

In accordance with one aspect of the present invention, there is provided a method for encoding a contour of an object in a current frame based on a previous frame, wherein the current and the previous frames include one or more objects, respectively, each of the objects having a contour, comprising the steps of: (a) generating a global motion vector representing a displacement between the current and the previous frames which yields a largest number of overlapping object pixels therebetween; (b) detecting the contours of the objects in the previous frame as previous contours, providing a contour number representing the number of the previous contours, and assigning index data to each of the previous contours in response to a predetermined processing order; (c) choosing one of the contours in the current frame as a current contour; (d) determining an optimum contour among the previous contours and setting a displacement between the current contour and the optimum contour as a local motion vector, the optimum contour being the one most similar to the current contour; (e) producing a predicted contour by shifting the optimum contour based on the global and the local motion vectors; (f) detecting an error representing a difference between the predicted contour and the current contour; (g) repeating the steps of (c) to (f) until all of the current contours in the current frame are processed; (h) generating flag signals describing how close each of the previous contours is to a corresponding current contour detected in the step (d) based on the contour number and contour encoding information corresponding to each of the current contours, wherein the contour encoding information contains the index data of the optimum contour, the error, and the local motion vector; (i) providing sequences of the errors and the local motion vectors for the current frame based on the contour encoding information corresponding to each of the current contours; and (j) outputting encoded contour data of the current frame by encoding the global motion vector, the sequences of the errors and the local motion vectors, and the flag signals.

In accordance with another aspect of the present invention, there is provided an apparatus for encoding a contour of an object in a current frame based on a previous frame, wherein the respective current and the previous frames include one or more objects, each of the objects having a contour, which comprises: a global motion vector detecting block for generating a global motion vector representing a displacement between the current and the previous frames which yields a largest number of overlapping object pixels therebetween; a previous contour providing block for detecting contours of the objects in the previous frame as previous contours, providing a contour number representing the number of the previous contours, and assigning index data to each of the previous contours in response to a predetermined processing order; a current contour providing block for choosing one of the contours in the current frame as a current contour; an optimum contour determining block for detecting, for each of the current contours in the current frame, an optimum contour among the previous contours and setting a displacement between the current contour and the optimum contour as a local motion vector, the optimum contour being the one most similar to the current contour; a predicted contour generating block for producing, for each of the current contours, a predicted contour by shifting the optimum contour based on the global and the local motion vectors; an error determining block for detecting, for each of the current contours, an error representing a difference between the predicted contour and the current contour; a flag signal producing block for generating flag signals describing how close each of the previous contours is to a corresponding current contour based on the contour number and contour encoding information corresponding to each of the current contours, wherein the contour encoding information contains the index data of the optimum contour, the error, and the local motion vector; a sequence outputting block for providing sequences of the errors and the local motion vectors for the current frame based on the contour encoding information corresponding to each of the current contours; and an multiplexing block for outputting encoded contour data of the current frame by encoding the global motion vector, the sequences of the errors and the local motion vectors, and the flag signals.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
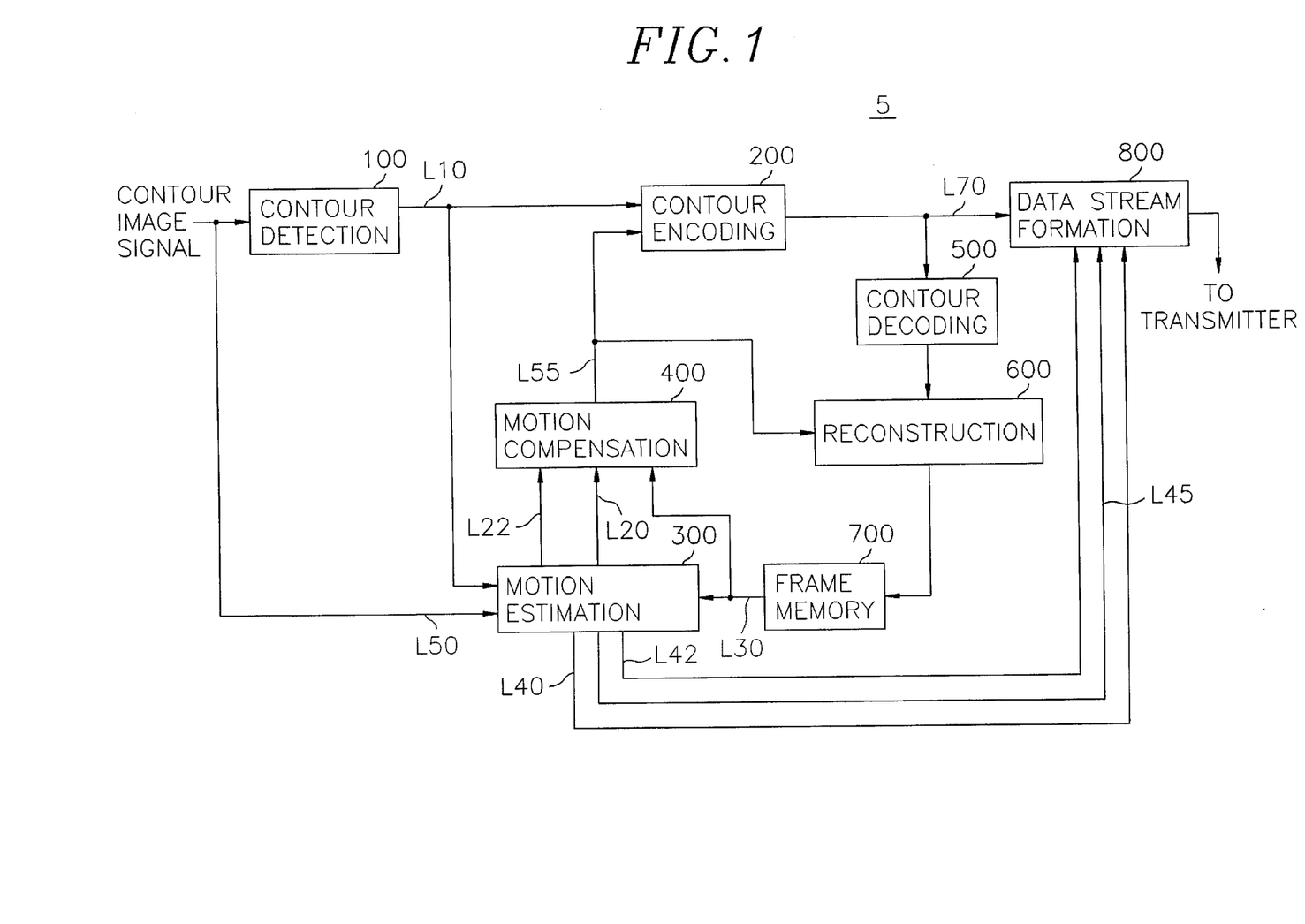
FIG. 1 represents a schematic block diagram of an apparatus for encoding a contour in accordance with the present invention.

Referring to FIG. 1, there is shown a schematic block diagram of an inventive apparatus 5 for encoding contours in a frame signal. A contour image signal of a current frame having one or more objects therein is inputted to a contour detection unit 100 and a motion estimation unit 300 via a line L50 in a form of a segmentation mask, wherein each pixel in the segmentation mask has a label identifying a region where it belongs to. For instance, a pixel in a background has a label "0" and each pixel in an object is labeled by one of non-zero values.

The contour detection unit 100 detects contours from the input segmentation mask and determines a processing order of each of the contours included in the contour image signal according to a predetermined processing order; and sequentially outputs contour information for each of the contours in the current frame, wherein the contour information includes contour data representing positions of contour pixels on a contour. The contour information on a line L10 from the contour detection unit 100 is provided as current contour information to a contour encoding unit 200, and a motion estimation unit 300.

The motion estimation unit 300 detects a previous contour most similar to the current contour on the line L10 as an "optimum contour" based on the current contour image signal on the line L50, the current contour information on the line L10 and a reconstructed previous contour image signal coupled thereto from a frame memory 700 via a line L30. The reconstructed previous contour image signal represents a previous frame which is in the form of a segmentation mask, each pixel therein having a label identifying a region where it belongs to. Outputs of the motion estimation unit 300 on lines L20 and L40 are the index data of the optimum contour and motion information representing a displacement between the current contour and the optimum contour. The motion estimation unit 300 will be described in detail with reference to FIGS. 2 and 3.

Figure 2:
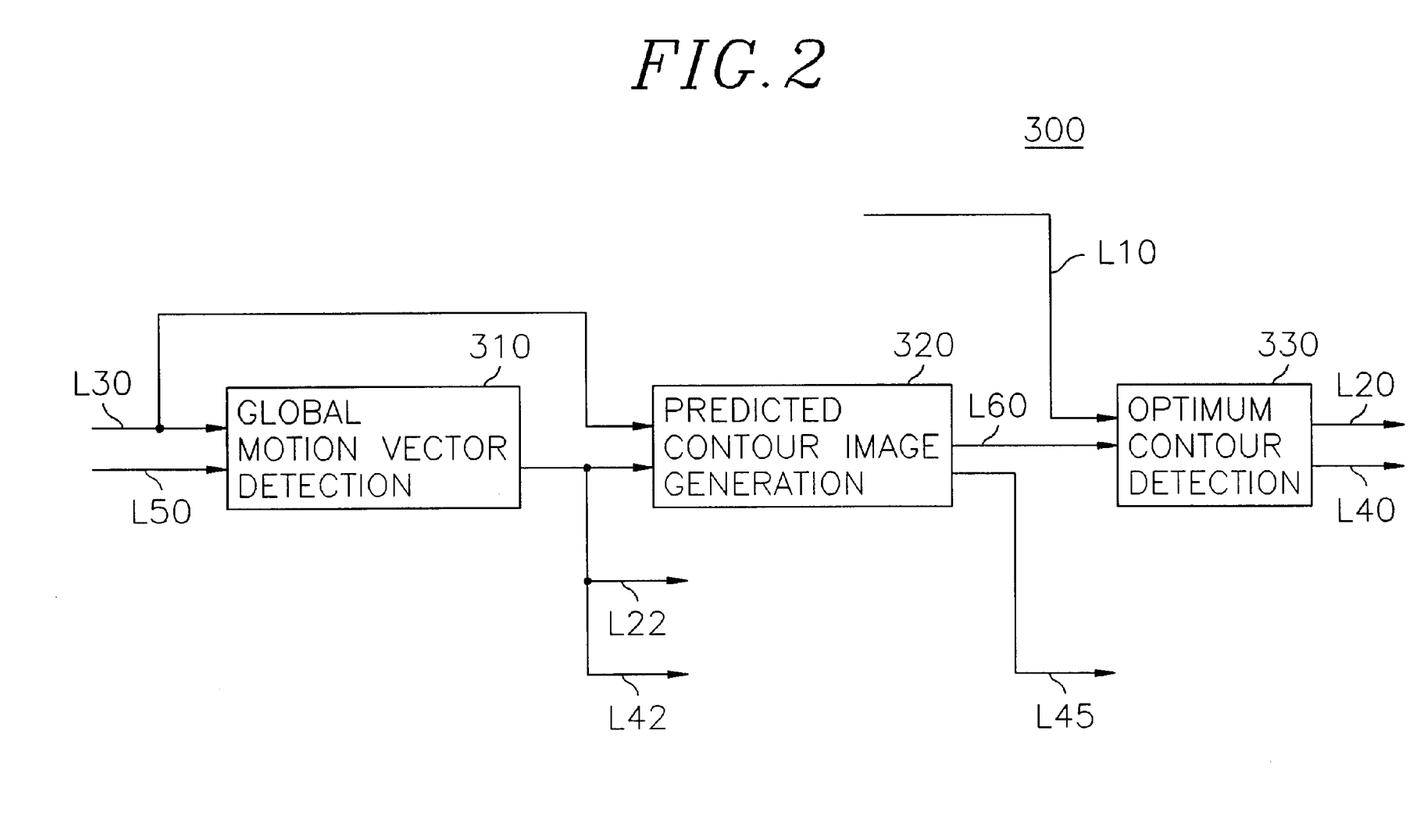
FIG. 2 provides a detailed block diagram of the motion estimation unit shown in FIG. 1.

Referring to FIG. 2, the motion estimation unit 300 includes a global motion vector detection block 310, a predicted contour image generation block 320, and an optimum contour detection block 330.

The global motion vector detection block 310, using the previous contour image signal on the line L30 and the current contour image signal on the line L50, detects a global motion vector (GMV) representing a displacement between the current and the previous frames which yields a largest number of overlapping object pixels therebetween. Detection of the GMV is carried out within a predetermined search range of, e.g., +/−16 pixels. The GMV derived at the global motion vector detection block 310 is fed to the predicted contour image generation block 320 and provided on lines L22 and L42 leading to the motion compensation unit 400 and a data stream formation unit 800, respectively.

At the predicted contour image generation block 320, the previous frame coupled thereto via the line L30 is shifted by the GMV to produce a predicted contour image. Further, as in the contour detection unit 100 shown in FIG. 1, the predicted contour image generation block 320 detects contours in the predicted contour image; assigns index data to each of the contours included in the predicted contour image according to the predetermined processing order; and sequentially outputs contour information for each of the contours in the predicted contour image, wherein the contour information includes contour data representing positions of contour pixels on a contour in the predicted contour image and index data thereof. Contour information for each of the predicted contours detected at the predicted contour image generation block 320 is fed on a line L60. The predicted contour image generation block 320 also detects the number of the contours in the predicted contour image, which is same as that of the previous frame, and provides it as a contour number L onto a line L45.

At the optimum contour detection block 330, based on predicted contour information on the line L60 and current contour information on the line L10, an optimum contour, a predicted contour most similar to the current contour, is detected among predicted contours residing within a preset search range, e.g., +/−8 pixels of the current contour; and a local motion vector (LMV) representing a spatial displacement between the current contour and the optimum contour and the index data of the optimum contour are outputted on the lines L20 and L40.

Figure 3:
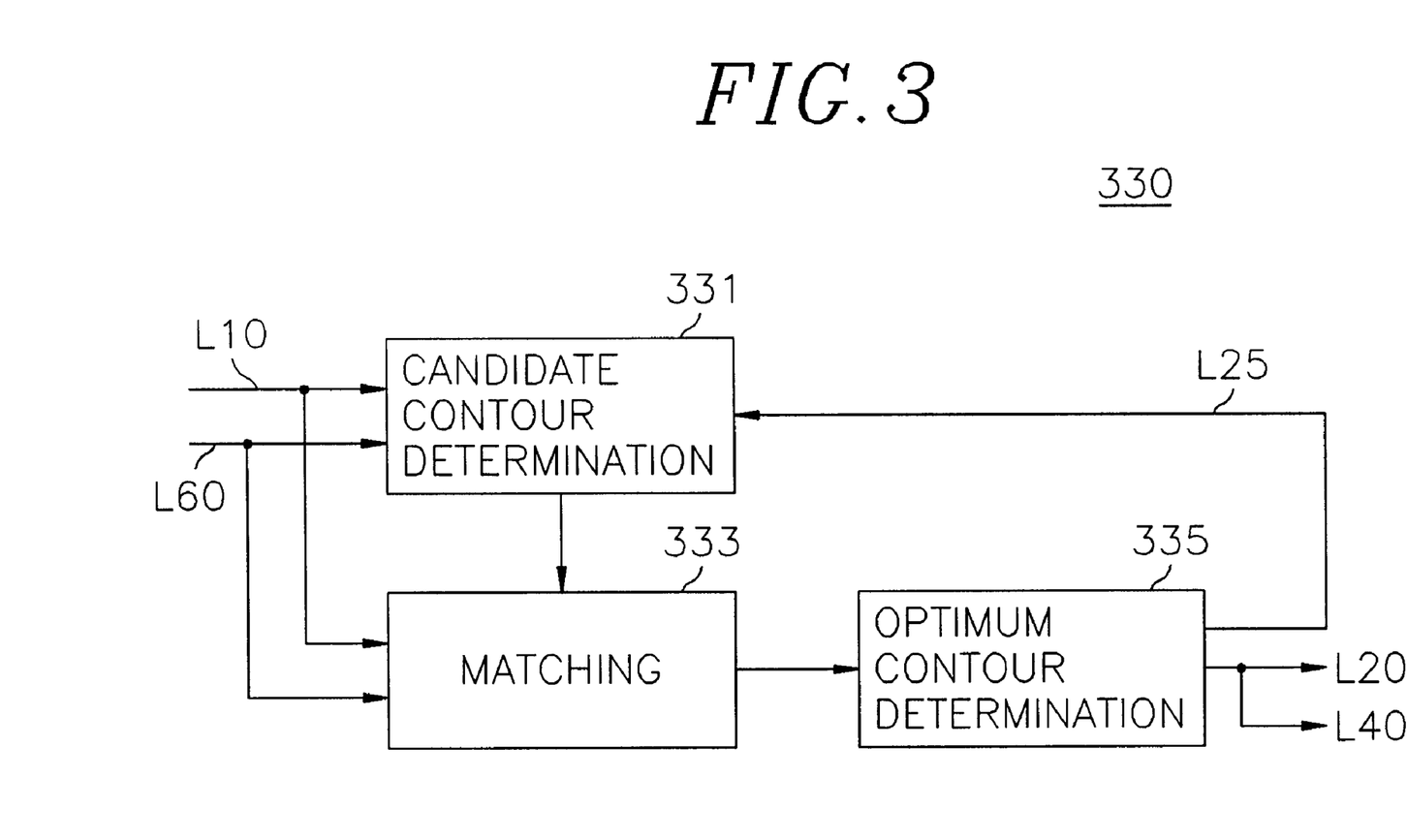
FIG. 3 shows a detailed block diagram of the optimum contour detection block shown in FIG. 2.

Referring to FIG. 3, there is shown in detail the optimum contour detection block 330, which includes a candidate contour determination sector 331, a matching sector 333, and an optimum contour determination sector 335.

The candidate contour determination sector 331 detects predicted contours residing within the preset search range from the current contour and calculates lengths of the current and the detected predicted contours based on the current contour information and the predicted contour information on the lines L10 and L60, respectively. Thereafter, the lengths of the current contours and each of those predicted contours within the preset search range are compared. If a difference between the length of a current contour and that of a predicted contour is smaller than M times the shorter one of the two contours, the predicted contour is determined as a candidate contour for the current contour, M being a predetermined number. After determining one or more candidate contours for the current contour, indication signals identifying those candidate contours, e.g., index data of the candidate contours, are fed to the matching sector 333. The length of a contour can be defined by, for example, the number of contour pixels which constitute the contour.

In another preferred embodiment of the invention, the candidate contours can be determined based on the numbers of pixels positioned inside the respective contours in lieu of the lengths thereof.

The matching sector 333 retrieves contour information for each candidate contour from the predicted contour image generation block 320 via the line L60 in response to the indication signals inputted thereto. Subsequently, the current contour and its candidate contour are matched based on the current contour information on the line L10 and the candidate contour information on the line L60. After matching the current contour with each candidate contour, the matching sector 333 provides the optimum contour determination sector 335 with matching information for each candidate contour. The matching information includes index data, a motion displacement and a matching length for a candidate contour. During the matching process for a candidate contour, the candidate contour is displaced by, e.g., a one pixel basis within the preset search range, and matching segments of the current and the candidate contours at each displacement are determined. Thereafter, the total length of the matching segments is computed for each displacement. The computed lengths are then compared with one another and the largest one thereof is determined as the matching length for the candidate contour and the displacement which yields the largest length is set as the motion displacement for the candidate contour.

Figure 5:
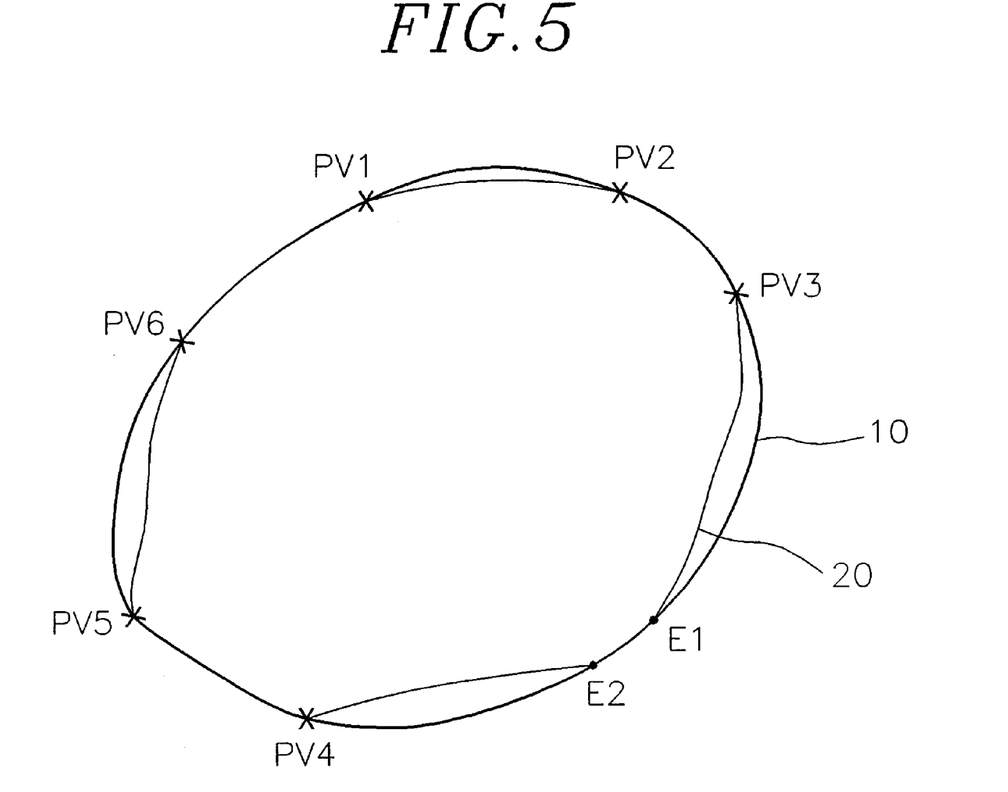
FIG. 5 illustrates a procedure of matching contours carried out in accordance with the preferred embodiment of the present invention.

Referring to FIG. 5, there are illustrated details of a matching segment determination scheme. FIG. 5 depicts a current contour 10 and a candidate contour 20 overlapping with each other. After overlapping the contours 10 and 20, the intersection points therebetween such as PV1 to PV6, E1 and E2 are detected and lengths of the overlapping segments PV6–PV1, PV2–PV3, E1–E2, and PV4–PV5 are calculated. If the length of an overlapping segment is greater than a threshold value TH1, the overlapping segment is determined as a matching segment. In FIG. 5, it is assumed that the length of the overlapping segment between E1 and E2 is not greater than the TH1; and the lengths of the remaining overlapping segments are greater than the TH1. Therefore, the remaining overlapping segments, e.g., PV2 to PV3, PV4 to PV5, and PV6 to PV1, are determined as the matching segments. In another preferred embodiment of the invention, determination of the matching segment can be carried out based on the number of contour pixels residing on a given overlapping segment in lieu of the length thereof.

At the optimum contour determination sector 335 responsive to the matching information for each candidate contour, the matching lengths of the candidate contours are compared with each other; and a candidate contour corresponding to a matching length of a maximum value is declared as the optimum contour of the current contour. The motion displacement corresponding to the optimum contour is set as the local motion vector (LMV). Outputs from the optimum contour determination sector 335 on the lines L20 and L40 are the LMV and the index data of the optimum contour. And, the index data of the optimum contour is also fed to the candidate contour determination sector 331 via a line L25 so as to prevent the sector 331 from selecting the predicted contour already determined as the optimum contour as a candidate contour in the following matching processes anymore. Therefore, each of the predicted contours in the predicted contour image has only one chance to be chosen as an optimum contour.

Referring back to FIG. 1, the motion compensation unit 400 generates a predicted current contour by retrieving the contour information corresponding to the optimum contour from the frame memory 700 via the line L30 based on the GMV on the line L22, and the LMV and the index data of the optimum contour on the line L20, wherein the predicted current contour represents the optimum contour shifted by the sum of the GMV and the LMV. The output to the contour encoding unit 200 and a reconstruction unit 600 provided via a line L55 from the motion compensation unit 400 is the predicted current contour information representing position data of contour pixels constituting the predicted current contour.

By using known contour coding techniques, the contour encoding unit 200 detects an error representing a difference between the current contour and the predicted current contour based on the predicted current contour information on the line L55 and the current contour information on the line L10; and encodes the error to thereby provide a coded error. The coded error is transferred to a contour decoding unit 500 and the data stream formation unit 800.

The contour decoding unit 500 decodes the coded error to thereby provide a decoded error to the reconstruction unit 600.

At the reconstruction unit 600, the decoded error from the contour decoding unit 500 is utilized in reconstructing the current image signal together with the predicted current contour information fed thereto via the line L55. In the reconstruction procedure, in order to produce the reconstructed current contour image signal representing a frame in the form of a segmentation mask, the reconstruction unit 600 assigns a label to each pixel included in each of contours constituting the frame. Therefore, each pixel in the segmentation mask has a label identifying a region where it belongs to. Then, the reconstructed current contour image signal is stored at the frame memory 700 and is utilized as a reconstructed previous image signal for the next current contour image signal.

Meanwhile, the data stream formation unit 800 provides encoded contour data containing control signals, e.g., flag signals, to a transmitter(not shown) for the transmission thereof based on the coded error on a line L70, the GMV on the line L42, the LMV and the index data of the optimum contour on the line L40, and the contour number L on the line L45, wherein the flag signals represent matching degrees between the contours in the current frame and those in the previous frame to thereby effectively transmit the encoded results produced based on the contour motion estimation technique.

Figure 4:
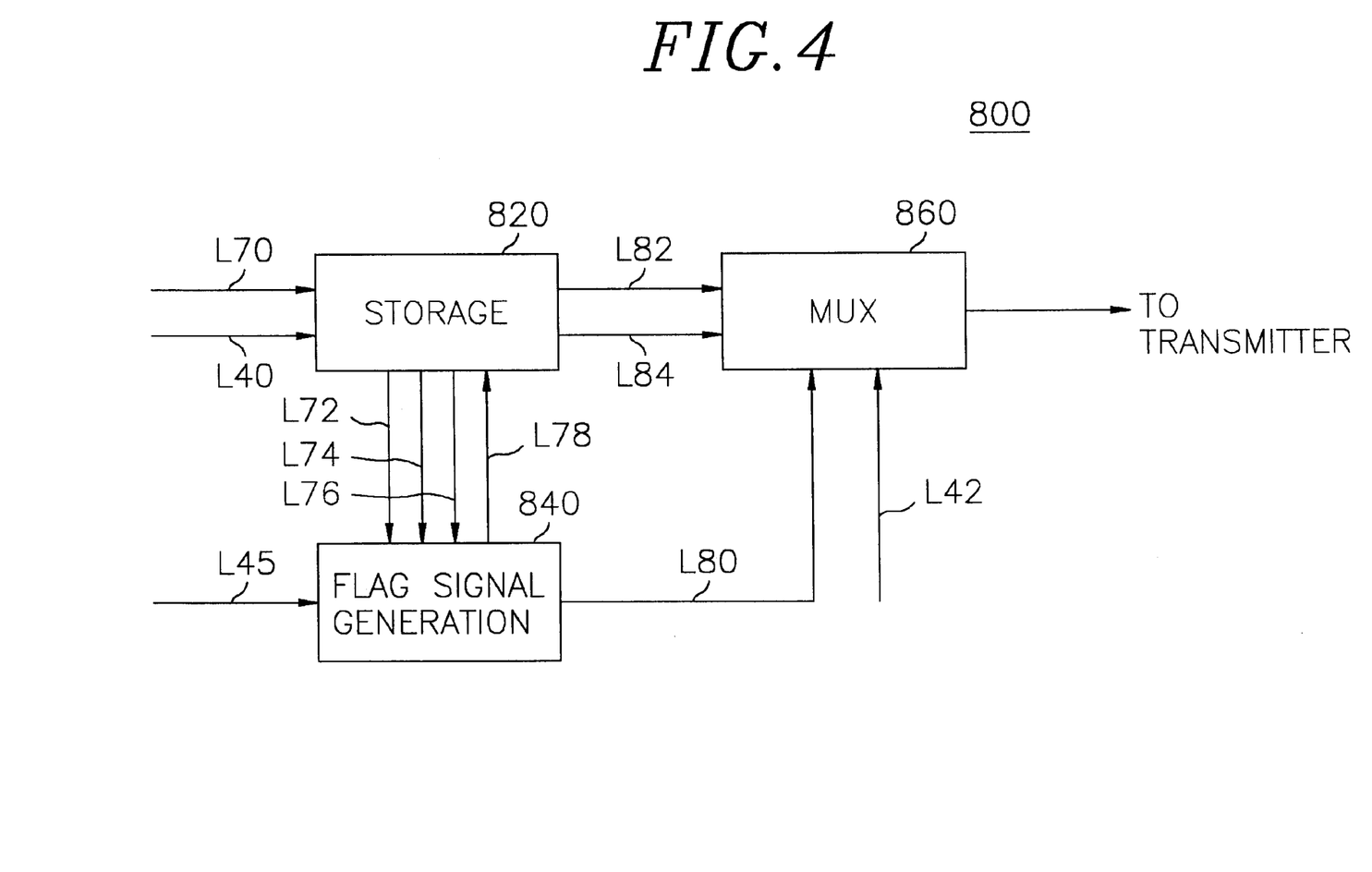
FIG. 4 describes a detailed block diagram of the data stream formation unit in FIG. 1.

Referring to FIG. 4, there is shown a detailed block diagram of the data stream formation unit 800 containing a storage block 820, a flag signal generation block 840, and a multiplexor (MUX) 860.

For each of the contours in the current frame, the storage block 820 stores contour encoding information including the LMV and the index data on the line L40 and the coded error on the line L70, corresponding to each of the current contours; provides the index data to the flag signal generation block 840 via a line L76; and produces a first and a second state signals onto lines L72 and L74, respectively, based on the coded error and the LMV stored therein.

In the above, the first and the second state signals represent states of the coded error and the LMV. That is, the first state signal depicts whether the encoded error has a zero value or not; and the second state signal represents whether there is the LMV or not and, if there is, further represents whether the LMV is a zero value or not. Furthermore, the storage block 820 provides the MUX 860 with the coded error and the LMV via lines L82 and L84, respectively, in response to an output control signal fed from the flag signal generation block 840 through a line L78.

The flag signal generation block 840 produces the output control signal and flag signals based on the index data on the line L76, the first and the second state signals on the lines L72 and L74, and the contour number L on the line L45. The flag signals are utilized to systematically represent matching degrees between the current contours and their corresponding previous contours. In order to generate the flag signals, it should be noticed that matching degrees between the current contours and the previous contours are determined, based on the index data and the first and the second state signals, as follows:

TABLE 1

| MATCHING DEGREE | ERROR | LMV | INDEX DATA |
| --- | --- | --- | --- |
| GM | ZERO | ZERO | Y |
| LM | ZERO | Y | Y |

TABLE 1-continued

| MATCHING DEGREE | ERROR | LMV | INDEX DATA |
| --- | --- | --- | --- |
| PM | Y | ZERO | Y |
|  | Y | Y | Y |
| NM | Y | N | N | wherein the letter 'Y' represents that its corresponding value has a non-zero value; the letter 'N' shows that its corresponding value has no value; and 'ZERO' depicts that its corresponding value has a zero value.

Furthermore in the [TABLE 1], the matching degree GM represents that a current contour is perfectly matched with one of the previous contours by shifting the previous frame based on the GMV, i.e., by global motion compensation, and, therefore, in the matching degree GM, there exists the index data while the coded error, i.e., ERROR, and the LMV have zero values. The matching degree LM illustrates that a current contour is perfectly matched with one of the previous contours by the global and local motion compensation and, in this case, there are the LMV having a non-zero value and the index data while the coded error has a zero value, wherein the local motion compensation is carried out by shifting the previous contours in the preset search range after the global motion compensation. Meanwhile, the matching degree PM indicates that a current contour is partially matched with one of the previous contours by the global and local motion compensation and, in this condition, there are two kinds of data conditions as shown in the [TABLE 1]. In the first case, although there exist the coded error, the LMV, and the index data, the LMV is a zero value. Therefore, it means that a previous contour matched with a current contour by the global motion compensation is the optimum contour of the current contour. In the second case, if a current contour is partially matched with one of the previous contours by the global and local motion compensation, there are the coded error, the index data and the LMV, corresponding to the current contour, having a non-zero value. The matching degree NM describes that a current contour is matched with none of the previous contours and, therefore, the coded error is only fed to the storage block 820, wherein the coded error is an encoding result obtained by intra-encoding the current contour.

Once the matching degree for each of the current contours is determined as shown in the [TABLE 1], the flag signals are produced based on the matching degrees between the current contours and the previous contours.

In accordance with the present invention, the flag signals includes four signals such as Gfs_flag, Global_flag, Contour_flag, and Contour flag_status. Hereinafter, each flag signal will be explained.

The Gfs_flag signal, representing whether the number of previous contours being perfectly matched with current contours by the global motion compensation belongs to a selected range or not, has a logic value as follows:

1 if $L < 4 \times GPM$ 0 if $L < 4 \times GPM$ wherein GPM is the number of previous contours which are perfectly matched with current contours by the global motion compensation; and L is the contour number.

According to the Gfs_flag signal, it can be recognized whether the Global_flag signal is produced or not. That is, if the Gfs_flag signal has a logic value 1, the Global_flag signal is outputted, and, if otherwise, the Global_flag signal is not generated.

The Global_flag signal, being produced when the Gfs_flag signal has a logic value 1, consists of L bits, each bit representing whether or not its corresponding previous contour is perfectly matched with one of the current contours by the global motion compensation. That is, if the Global_flag signal contains a bit having a logic value 1, it indicates the corresponding previous contour is completely matched with one of the current contours.

The Contour flag signal is represented by M bits if the Gfs_flag signal has a logic value 1, each bit showing whether or not its corresponding previous contour is perfectly or partially matched with one of the current contours based on the global and local motion compensation, M being L-GPM. In this case, the Contour_flag signal defines the rest of previous contours except the previous contours perfectly matched with one of the current contours by the global motion compensation. That is, if the Contour_flag signal has a bit of a logic value 1, its corresponding previous contour is matched with one of the current contours. If otherwise, its corresponding previous contour is not matched with any current contour. On the other hand, if the Gfs_flag signal has a logic value 0, the Global_flag signal is not produced and, therefore, the Contour_flag signal contains L bits to define whether each of the previous contours is matched with one of the current contours by the global and local motion compensation.

If the Gfs_flag signal has a logic value 1, the Contour_flag_status signal represents whether a previous contour is completely matched with one of the current contours based on the global and local motion compensation, wherein the Contour_flag_status signal includes CPM bits, CPM being the number of previous contours which are perfectly or partially matched with one of the current contours based on the global and local motion compensation. However, the CPM does not contain the previous contours corresponding to the GPM. Also, if a previous contour is matched with none of the current contours, its corresponding bit is not within the Contour_flag_status signal. On the other hand, if the Gfs_flag signal has a logic value 0, the Contour_flag_status signal is represented by using CPM+GPM bits and describes matching degrees of previous contours which are completely or partially matched with current contours by the global and local motion compensation.

The flag signals produced at the flag signal generation block 840 as explained above are fed to the MUX 860 via a line L80. Meantime, the flag signal generation block 840 provides the output control signal to the storage block 820.

In response to the output control signal, the storage block 820 provides sequences of the coded errors and the LMVs for the current frame to the MUX 860 through lines L82 and L84, respectively. The sequences of the coded errors and the LMVs follow the processing order of the previous contours in the previous frame. And, coded errors for current contours which are not matched with any of the previous contours are sequentially outputted after those for matched current contours.

Referring to FIGS. 6A, 6B, 7A, and 7B, the procedure of determining the flag signals and the sequences of the errors and the LMVs in accordance with the present invention can be easily understood.

Figure 6A:
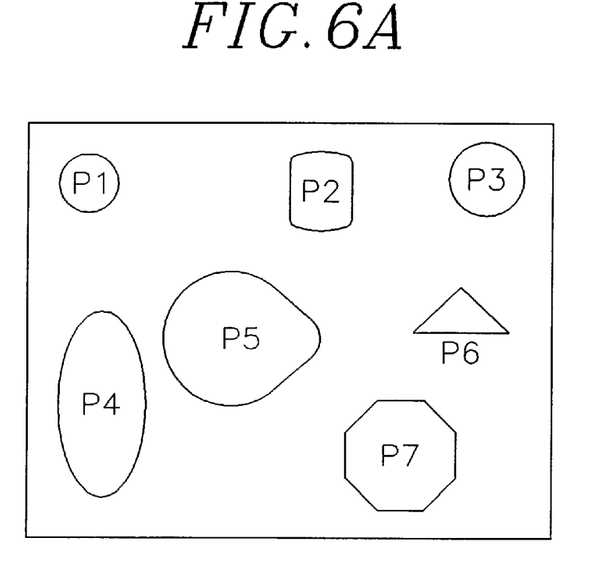
FIGS. 6A and 6B depict a previous and a current frames containing a plurality of contours, respectively.
Figure 6B:
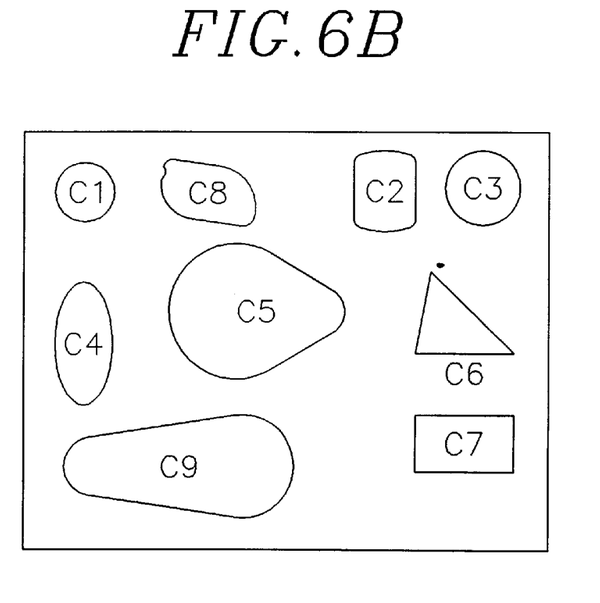

In FIGS. 6A and 6B, there are exemplarily demonstrated a previous and a current frames containing a plurality of contours, respectively. The previous frame in FIG. 6A includes 7 number of previous contours having index data P1 to P7 and the current frame in FIG. 6B consists of 9 number of current contours represented by index data C1 to C9 on requirement.

Figure 7A:
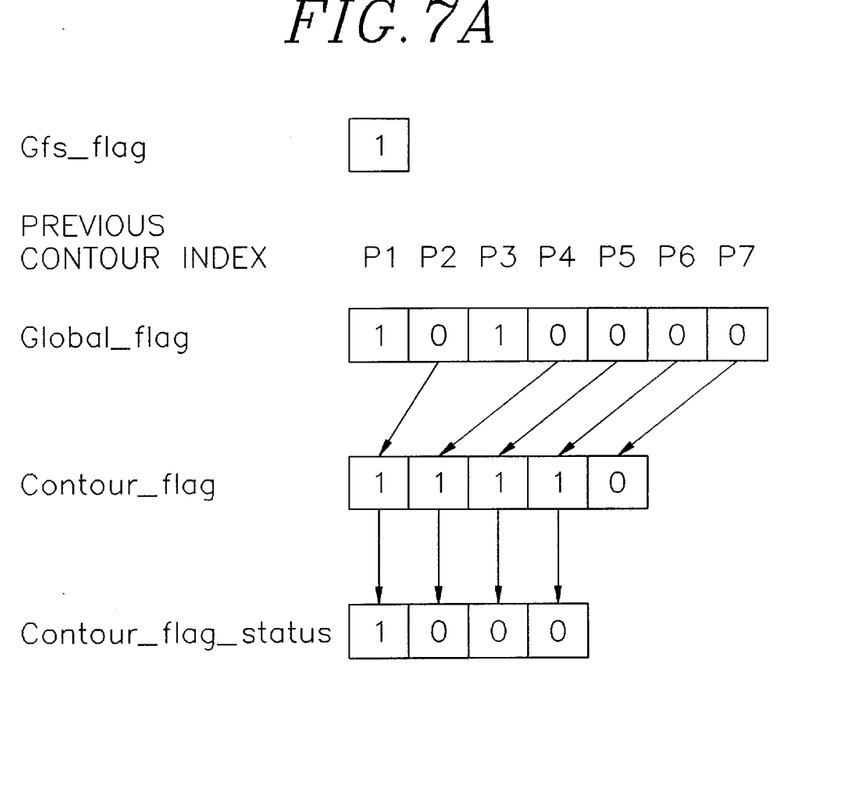
FIGS. 7A and 7B signify the states of flag signals produced in accordance with the present invention.
Figure 7B:
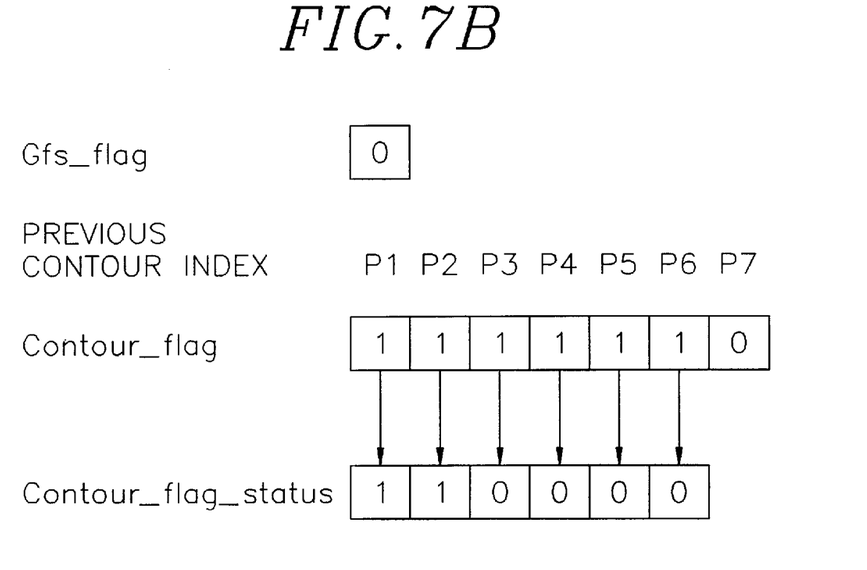

With reference to FIGS. 7A and 7B, there are shown two examples of the flag signals produced based on the previous and the current frames in FIGS. 6A and 6B.

In the first example, assuming that the current contours C1 and C3 are completely matched with the previous contours P1 and P3, respectively, by the global motion compensation; the current contour C2 is perfectly matched with the previous contour P2 by the local motion compensation executed after the global motion compensation; the current contours C4, C5, and C6 are partially matched with the previous contours P4, P5, and P6, respectively, by the global and local motion compensation; the current contours C7, C8, and C9 are matched with none of the previous contours; and the previous contour P7 is not matched with any current contour. According to the drawings and the above assumption, since the contour number L is 7 and the GPM is 2, L becomes smaller than 4×GPM. Therefore, the Gfs_flag signal has a logic value 1 and the Global_flag, Contour_flag, and Contour_flag_status signals are determined as shown in FIG. 7A based on the definitions of the flag signals. As can be seen in FIG. 7A, the bit arrangements of the flag signals depend on the processing order of the previous contours. Consequently, considering the flag signals, the matching degrees between the previous contours and the current contours can be noticed and the sequences of the LMVs and the coded errors corresponding to the matched contours are also determined. That is, in the first example, there exist the LMVs corresponding to the previous contours P1 to P6 in view of the [TABLE 1]. Thus, the sequence of the LMVs for the matched contours follows a sequence of P1-P2-P3-P4-P5-P6 although the LMVs corresponding to the previous contours P1 and P3 have zero values. On the other hand, the sequence of the coded errors for the matched contours is related to the processing order of the current and the previous contours. In view of the index data of the current and the previous contours, the sequence of the coded errors is determined according to a sequence of P1-P2-P3-P4-P5-P6-C7-C8-C9, wherein the coded errors for the current contours C1 to C3 corresponding to the previous contours P1 to P3 have zero values and the coded errors for the current contours C7 to C9 have been obtained by intra-encoding the contours C7 to C9.

In the second example, unlike the assumption of the first, it is presumed that the current contour C3 is partially matched with the previous contour P3 based on the global and local motion compensation. However, the rest of the assumption is the same as the first example. According to the presumption of this example, since the contour number L is 7 and the GPM is 1, L becomes larger than 4×GPM. Therefore, the Gfs_flag signal has a logic value 0 and the Contour flag and Contour_flag_status signals are determined as shown in FIG. 7B except the Global flag signal. According to the flag signals in FIG. 7B, the LMVs corresponding to the previous contours P1 to P6 exist in view of the [TABLE 1] and the LMVs for the matched contours are transferred in the same sequence of P1-P2-P3-P4-P5-P6. However, unlike in the first example, in this example, the LMV corresponding to the previous contour P1 only has a zero value because the previous contour P3 is partially matched with the current contour C3. On the other hand, the sequence of the coded errors for the current contours is determined in response to a sequence of P1-P2-P3-P4-P5-P6-C7-C8-C9, wherein the coded errors for the current contours C1 and C2 corresponding to the previous contours P1 and P2 have zero values and the coded errors for the current contours C7 to C9 were obtained by intra-encoding the contours C7 to C9.

As explained above, the flag signals and the sequences of the coded errors and LMVs for the current frame are produced at the flag signal generation block 840 and the storage block 820, and then provided to the MUX 860.

At the MUX 860, the encoded contour data is produced to a transmitter(not shown) for the transmission thereof based on the GMV on the line L42, the flag signals on the line L80, the sequence of the coded errors on the line L82, and the sequence of the LMVs on the line L84.

While the present invention has been described with respect to certain preferred embodiments only, other modifications and variations may be made without departing from the spirit and scope of the present invention as set forth in the following claims.

What is claimed is:

1. A method for encoding a contour of an object in a current frame based on a previous frame, wherein the current and the previous frames include one or more objects, respectively, each of the objects having a contour, comprising the steps of:
   (a) generating a global motion vector representing a displacement between the current and the previous frames which yields a largest number of overlapping object pixels therebetween;
   (b) detecting the contours of the objects in the previous frame as previous contours, providing a contour number representing the number of the previous contours, and assigning index data to each of the previous contours in response to a predetermined processing order;
   (c) choosing one of the contours in the current frame as a current contour;
   (d) determining an optimum contour among the previous contours and setting a displacement between the current contour and the optimum contour as a local motion vector, the optimum contour being a contour among the previous contours most similar to the current contour;
   (e) producing a predicted contour by shifting the optimum contour based on the global and the local motion vectors;
   (f) detecting an error representing a difference between the predicted contour and the current contour;
   (g) repeating the steps of (c) to (f) until all of the current contours in the current frame are processed;
   (h) generating flag signals describing how close each of the previous contours is to a corresponding current contour detected in the step (d) based on the contour number and contour encoding information corresponding to each of the current contours, wherein the contour encoding information contains the index data of the optimum contour, the error, and the local motion vector;
   (i) providing sequences of the errors and the local motion vectors for the current frame based on the contour encoding information corresponding to said each of the current contours; and
   (j) outputting encoded contour data of the current frame by encoding the global motion vector, the sequences of the errors and the local motion vectors, and the flag signals.

2. The method according to claim 1, wherein the step (h) includes the steps of:
   (h1) providing a Gfs_flag signal by comparing the number of previous contours, which completely overlap with their corresponding current contours through global motion compensation, with a predetermined threshold value, wherein the global motion compensation is performed by shifting one of the current and the previous frames toward the other by the global motion vector;
   (h2) generating, in response to the Gfs_flag signal, a Global_flag signal containing L bits, each bit representing whether or not its corresponding previous contour completely overlaps with one of the current contours by the global motion compensation, L being the contour number;
   (h3) supplying, in response to the Gfs_flag signal, a Contour_flag signal having M bits, each bit showing whether or not its corresponding previous contour completely or partially overlaps with one of the current contours in a preset search range by a global and local motion compensation, wherein the global and local motion compensation is carried out based on the global motion vector and the local motion vector corresponding to each of the current contours, M being a positive integer; and
   (h4) producing, in response to the Gfs_flag signal, a Contour_flag_status signal containing N bits, each bit illustrating whether or not its corresponding previous contour completely overlaps with one of the current contours by the global and local motion compensation, wherein the overlapping degree of each of the previous contours and its corresponding current contour is determined based on the contour number and the contour encoding information corresponding to each of the current contours, N being a positive integer.

3. The method according to claim 2, wherein each of the sequences of the flag signals follows the sequence of the index data assigned to each of the previous contours.

4. The method according to claim 3, wherein the Gfs_flag signal has a logic value of:

$$1 \text{ if } L < 4 \times GPM$$

$$0 \text{ if } L \geq 4 \times GPM$$

wherein GPM is the number of the previous contours which completely overlap with their corresponding current contours through the global motion compensation.

5. The method according to claim 4, wherein if the Gfs_flag signal has a logic value 1, the Global_flag signal is generated and, if otherwise, the Global_flag signal is not.

6. The method according to claim 5, wherein the Global_flag signal consists of L bits, each bit having a logic value 1 when its corresponding previous contour completely overlaps with one of the current contours by the global motion compensation.

7. The method according to claim 6, wherein the Contour_flag signal includes two different bit streams as:
   if the Gfs_flag signal has a logic value 1, it is represented by M bits, M being equal to L-GPM, wherein each bit describes each of the rest of the previous contours except those previous contours perfectly overlapping with one of the current contours by the global motion compensation; and
   if the Gfs_flag signal has a logic value 0, it contains M bits, M being equal to L, to define how close each of the previous contours is to its corresponding current contour by the global and local motion compensation, wherein if the Contour_flag signal has a bit of a logic value 1, its corresponding previous contour completely or partially overlaps with one of the current contours in the preset search range and, if otherwise, its corresponding previous contour overlaps none of the current contours in the preset search range.

8. The method according to claim 7, wherein the Contour_flag_status signal includes two different bit streams as:

if the Gfs_flag signal has a logic value 1, it is represented by N bits, N being equal to CPM, CPM being the number of the previous contours which completely or partially overlap with one of the current contours by the global and local motion compensation except the previous contours corresponding to GPM; and if the Gfs_flag signal has a logic value 0, it has N bits, N being equal to CPM+GPM, each bit describing the previous contours which completely or partially overlap with their corresponding current contours by the global and local motion compensation, wherein if the Contour_flag_status signal has a bit of a logic value 1, its corresponding previous contour completely overlaps with one of the current contours in the preset search range.

9. The method according to claim 8, wherein, in the step (i), the sequences of the errors and the local motion vectors for the current frame follow the sequence of the index data assigned to each of the previous contours.

10. The method according to claim 9, wherein, if there are current contours overlapping none of the previous contours in the preset search range, said current contours are intra-encoded and the contour encoding information thereof has only errors obtained by the intra-encoding.

11. The method according to claim 10, wherein, in the sequence of the errors, errors for the current contours which overlap none of the previous contours are sequentially outputted according to a processing order of the current contours in the current frame after errors for overlapping current contours are outputted.

12. An apparatus for encoding a contour of an object in a current frame based on a previous frame, wherein the current and the previous frames include one or more objects, respectively, each of the objects having a contour, which comprises:

means for generating a global motion vector representing a displacement between the current and the previous frames which yields a largest number of overlapping object pixels therebetween;

means for detecting the contours of the objects in the previous frame as previous contours, providing a contour number representing the number of the previous contours, and assigning index data to each of the previous contours in response to a predetermined processing order;

means for choosing one of the contours in the current frame as a current contour;

means for determining, for each of the current contours in the current frame, an optimum contour among the previous contours and setting a displacement between the current contour and the optimum contour as a local motion vector(LMV), the optimum contour being a contour among the previous contours most similar to the current contour;

means for producing, for said each of the current contours, a predicted contour by shifting the optimum contour based on the global and the local motion vectors;

means for detecting, for said each of the current contours, an error representing a difference between the predicted contour and the current contour;

means for generating flag signals describing how close each of the previous contours is to a corresponding current contour based on the contour number and contour encoding information corresponding to said each of the current contours, wherein the contour encoding information contains the index data of the optimum contour, the error, and the local motion vector;

means for providing sequences of the errors and the local motion vectors for the current frame based on the contour encoding information corresponding to said each of the current contours; and means for outputting encoded contour data of the current frame by encoding the global motion vector, the sequences of the errors and the local motion vectors, and the flag signals.

13. The apparatus as recited in claim 12, wherein the flag signals generating means includes:

means for providing, for each of the current contours, a first state signal depicting whether the error has a zero value or not and a second state signal representing whether there is the LMV or not and, if there is the LMV, further representing whether the LMV is a zero value or not; and means for producing the flag signals by determining, for said each of the current contours, how close each of the previous contours is to a corresponding current contour based on the contour number, the index data, the first and the second state signals.

14. The apparatus as recited in claim 13, wherein how close each of the previous contours is to a corresponding current contour is determined as:

| MATCHING DEGREE | ERROR | LMV | INDEX DATA |
| --- | --- | --- | --- |
| GM | ZERO | ZERO | Y |
| LM | ZERO | Y | Y |
| PM | Y | ZERO | Y |
|  | Y | Y | Y |
| NM | Y | N | N | wherein the letter 'Y' represents that its corresponding value has a non-zero value; the letter 'N' shows that its corresponding value has no value; 'ZERO' depicts that its corresponding value has a zero value; the matching degree GM represents that a corresponding current contour perfectly overlaps with one of the previous contours in a preset search range by global motion compensation; the matching degree LM illustrates that a corresponding current contour overlaps perfectly with one of the previous contours in the preset search range by global and local motion compensation; the matching degree PM indicates that a corresponding current contour overlaps partially with one of the previous contours in the preset search range by the global and local motion compensation; and the matching degree NM describes that a corresponding current contour overlaps with none of the previous contours in the preset search range, wherein the states of the error and the LMV are represented by the first and the second state signals.

15. The apparatus as recited in claim 14, wherein the flag signals producing means includes:

means for providing a Gfs_flag signal by comparing the number of previous contours in the matching degree GM with a predetermined threshold value;

means for generating, in response to the Gfs_flag signal, a Global_flag signal containing L bits, each bit having a logic value 1 when its corresponding previous contour belongs to the matching degree GM, L being the contour number;

means for supplying, in response to the Gfs_flag signal, a Contour_flag signal having M bits, each bit showing to which one of the matching degrees its corresponding previous contour belongs, M being a positive integer; and means for producing, in response to the Gfs_flag signal, a Contour_flag status signal containing N bits, N being a positive integer, each bit illustrating whether its corresponding previous contour belongs to either the matching degree LM or PM.

16. The apparatus as recited in claim 15, wherein the Gfs_flag signal has a logic value of:

1 if $L < 4 \times GPM$ 0 if $L \geq 4 \times GPM$ wherein GPM is the number of the previous contours belonging to the matching degree GM.

17. The apparatus as recited in claim 16, wherein if the Gfs_flag signal has a logic value 1, the Global_flag signal is generated and, if otherwise, the Global_flag signal is not.

18. The apparatus as recited in claim 17, wherein the Contour_flag signal includes two different bit streams as:

if the Gfs_flag signal is a logic value 1, it is represented by M bits, M being equal to L-GPM, wherein each bit describes each of the rest of previous contours except the previous contours belonging to the matching degree GM; and if the Gfs_flag signal has a logic value 0, it contains M bits, M being equal to L, to define how close each of the previous contours is to its corresponding current contour by the global and local motion compensation, wherein if the Contour_flag signal has a bit of a logic value 1, its corresponding previous contour belongs to the matching degree GM, LM, or PM and, if otherwise, its corresponding previous contour belongs to the matching degree NM.

19. The apparatus as recited in claim 18, wherein the Contour_flag_status signal includes two different bit streams as:

if the Gfs_flag signal has a logic value 1, it is represented by N bits, N being equal to CPM, CPM being the number of the previous contours which belong to the matching degree LM or PM and each bit having a logic value 1 when its corresponding previous contour belongs to the matching degree LM; and if the Gfs_flag signal has a logic value 0, it has N bits, N being equal to CPM+GPM, each bit having a logic value 1 when its corresponding previous contour belongs to the matching degree GM or LM.

20. The apparatus as recited in claim 19, wherein the sequences of the errors and the local motion vectors for the current frame follow the sequence of the index data assigned to each of the previous contours.

21. The apparatus as recited in claim 20, wherein, if there are the current contours belonging to the matching degree NM, said current contours are intra-encoded and the contour encoding information thereof has only errors obtained by the intra-encoding.

22. The apparatus as recited in claim 21, wherein, in the sequence of the errors, errors for current contours belonging to the matching degree NM are sequentially outputted according to a processing order of the current contours in the current frame after errors for current contours belonging to the other matching degrees are outputted.

* * * * *